E. H. PORTER.
PIPE FOR THE CONVEYANCE OF FLUIDS.
APPLICATION FILED FEB. 10, 1914.
1,218,895.   Patented Mar. 13, 1917.
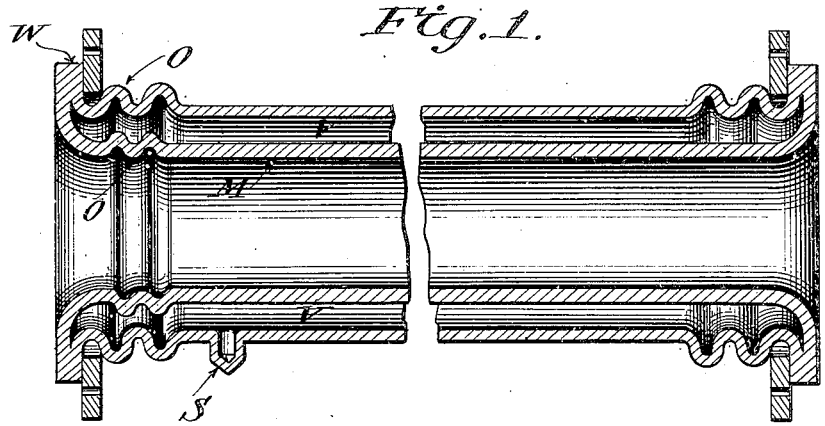
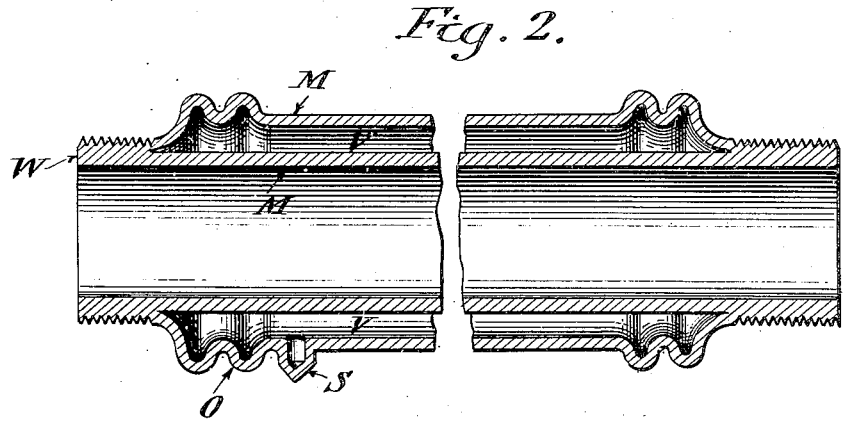
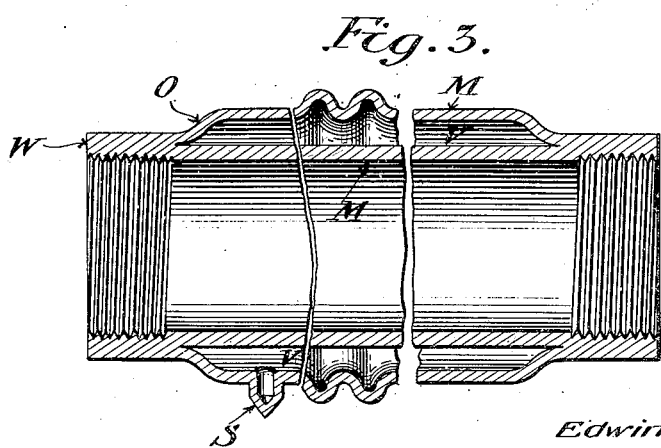
Inventor:
Edwin H. Porter
by Eugene C. Brown
Attorney

UNITED STATES PATENT OFFICE.

EDWIN H. PORTER, OF PHILADELPHIA, PENNSYLVANIA.

PIPE FOR THE CONVEYANCE OF FLUIDS.

1,218,895. Specification of Letters Patent. Patented Mar. 13, 1917.

Application filed February 10, 1914. Serial No. 817,818.

*To all whom it may concern:*

Be it known that I, EDWIN H. PORTER, a citizen of the United States, residing at Philadelphia, in the county of Philadelphia and State of Pennsylvania, have invented certain new and useful Improvements in Pipes for the Conveyance of Fluids, of which the following is a specification.

My invention relates to commercial pipes for the conveyance of fluids and more particularly to pipes for the conveyance of liquids and gases at a temperature differing from that of the surrounding medium, and specifically to a construction of such pipes whereby the flow of heat between the liquid or gas inside the pipe, to or from the external surrounding medium, is reduced to a minimum.

It is well known in the art that a space of high vacuum interposed between adjacent opposed surfaces, is a very effective means of preventing the transfer of heat between the two surfaces, and my invention consists in such a construction of pipes as to provide the two walls, separated by a vacuum space throughout their length, and so joined at their adjacent ends as to be solid and permanently air tight.

I have also arranged to avoid undue strains being set up in the two walls due to unequal expansion or contraction of the walls, due to the unequal temperature of the two.

In the application of my invention I contemplate using standard metal pipe fittings or lengths of tubing in commercial lengths, as used in the art, of different diameters; placing same in concentric position each to the other, swaging in one, or both, a surface off-set bend in the short lengths, and in the longer lengths two or more combined surface off-set bends or corrugations, and solidly welding the adjacent ends of the tubes together, forming an included space, then exhausting this space to a high vacuum through a small outlet provided, and closing the outlet by sealing or welding.

Recent development in the art of swaging and welding metal plates make this construction commercially practicable and thus makes possible the maintaining of a vacuum chamber between the two walls that is permanent in character.

The off-set surface bends or corrugations in the metal also produce a lengthened path of the metal heat-conducting circuit, between the inner and outer walls diminishing the rate of transfer of heat through the conducting metal at the junction of the walls and thus reduces the part of the total length of pipe that requires protecting with external non-conducting material.

The completed units are joined up in any of the standard commercial methods to comprise a complete system for distributing liquids and gases with a minimum change in the temperature of same.

The above construction is of value in piping the high temperature super-heated steam in modern power houses, in under-ground steam heating systems, in refrigerating plants for conveying the cold gases or brine and many other similar operations where heat insulation is required.

Referring to the drawings, Figure 1 shows a section through a pipe so constructed, arranged for coupling by means of external flanges. Fig. 2 shows in section a similarly arranged pipe fitted with an external thread connection. Fig. 3 shows in section a similar pipe arranged with an internal thread connection such as would couple to the pipe shown in Fig. 2 for joining same in continuous lengths.

Fig. 4 shows in section a 90° bend of the same construction.

Many other styles of application of the same construction could be shown but the above are sufficient to show the application of our construction to all standard pipe requirement.

In each figure of the drawings W indicates the point of the solid metallic joint or weld, of the metal tubing walls.

M is the metal tubing. V is the vacuum space.

S is the sealing-off tube. O is the off-set bend or corrugation in the metal tube M.

Having thus shown and described my invention, what I claim as new and wish to protect by Letters Patent of the United States is set forth in the following claims:

1. An integral unit for pipes for conveying fluids with a minimum of heat transference between the interior bore or passage of the pipe and the exterior, comprising a duplex tubular metallic casing having imperforate inner and outer walls inclosing an exhausted or vacuum annular space extending substantially throughout the length thereof, said walls being united at the ends into a single wall, and having corrugations adjacent the union of the walls at each end to accommodate the variations in the expansion of the walls and relieve the strains at the points of union between the inner and outer walls of the duplex casing.

2. An integral unit for pipes for conveying fluids with a minimum of heat transference between the interior bore or passage of the pipe and the exterior, comprising a duplex tubular metallic casing having imperforate inner and outer walls inclosing an exhausted or vacuum annular space extending substantially throughout the length thereof, said inner and outer walls being welded at each end into single end portions, the outer wall having corrugations at each end adjacent the weld union to thereby relieve the strains at this point caused by the variations in expansion between the inner and outer walls.

3. An integral unit for pipes for conveying fluids with a minimum of heat transference between the interior bore or passage of the pipe and the exterior, comprising a duplex tubular metallic casing having imperforate inner and outer walls inclosing an exhausted or vacuum annular space extending substantially throughout the length thereof, said inner and outer walls being welded at each end into single end portions, the one of said walls having corrugations therein to thereby relieve the strains at the points of union of the inner and outer walls caused by the variations in expansion between the inner and outer walls.

In testimony whereof I affix my signature in presence of two witnesses.

EDWIN H. PORTER.

Witnesses:
EMMA D. CHAPPELL,
JOSEPH B. SEAMAN.